(12) United States Patent
Molinie et al.

(10) Patent No.: US 7,773,857 B2
(45) Date of Patent: Aug. 10, 2010

(54) PROCESS AND DEVICE FOR AUDIO-VISUAL PROGRAM EDITING

(75) Inventors: Alain Molinie, Clapiers (FR); Eric Lavigne, Clapiers (FR); Vincent Leclaire, Clapiers (FR)

(73) Assignee: Awox SA, Clapiers (FR)

( * ) Notice: Subject to any disclaimer, the term of this patent is extended or adjusted under 35 U.S.C. 154(b) by 945 days.

(21) Appl. No.: 10/580,331

(22) PCT Filed: Feb. 1, 2006

(86) PCT No.: PCT/IB2006/000179

§ 371 (c)(1),
(2), (4) Date: Nov. 8, 2006

(87) PCT Pub. No.: WO2006/082494

PCT Pub. Date: Aug. 10, 2006

(65) Prior Publication Data

US 2009/0116810 A1    May 7, 2009

(30) Foreign Application Priority Data

Feb. 1, 2005    (FR)  ................................. 05 01061

(51) Int. Cl.
*H04N 5/93*    (2006.01)
(52) U.S. Cl. .......................................... 386/55; 386/52
(58) Field of Classification Search .................. 386/52, 386/55, 46, 96, 124, 125
See application file for complete search history.

(56) References Cited

U.S. PATENT DOCUMENTS

| 6,016,380    A  * |  1/2000 | Norton ......................... 386/52 |
| 2003/0215214 A1 * | 11/2003 | Ma .............................. 386/52 |

* cited by examiner

*Primary Examiner*—Robert Chevalier
(74) *Attorney, Agent, or Firm*—Young & Thompson

(57) ABSTRACT

The audio-visual program editing process comprises:
 in an iterative manner, a step (200) of editing the combined image comprising:
  a step (210) of selecting an image source,
  a step (230) of selecting a part of the selected image and
  a step (250) of selecting a display format for the said selected image part, in a combined image;
 after the end of the step of editing the combined image, a step (270) of memorizing each image source, each image part and each display format of the combined image and
 a step (280) of displaying the combined image, in the course of which, the display of each image part is automatically refreshed.

20 Claims, 4 Drawing Sheets

PROCESS AND DEVICE FOR AUDIO-VISUAL PROGRAM EDITING

Figure 1:
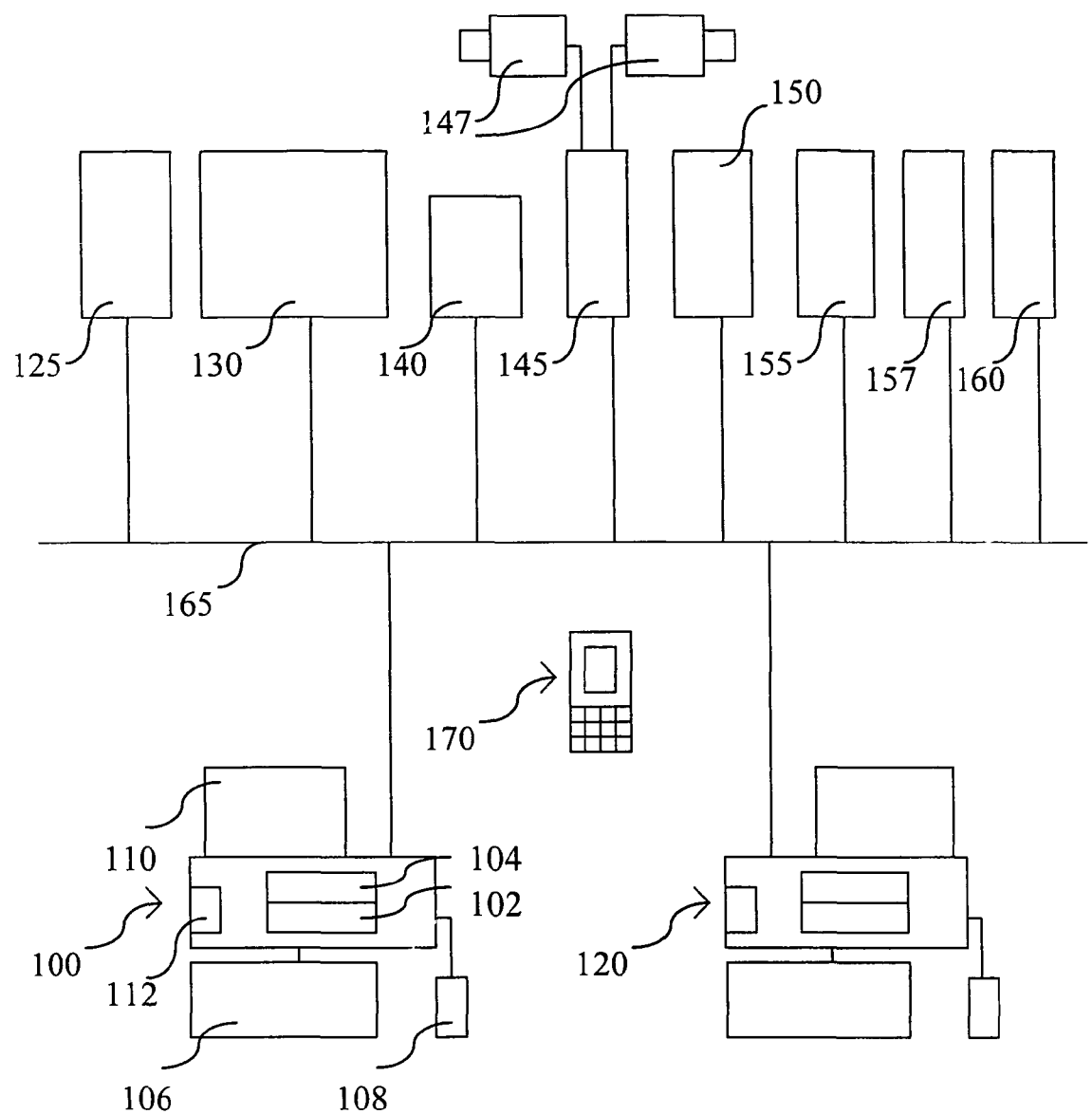

The present invention relates to a process and a device for editing an audio-visual program. It applies, in particular to creation, by its user, of a page comprising multiple windows coming from diverse sources, notably all or a portion of Internet sites and services and sources of data and local media.

Many professionals are currently obliged to use a plurality computer or video screens in order to follow the many sources of information that concern them in the framework of their work, for example video-surveillance images, audio-visual programs, stock quote screens, production unit supervision screens, video conference, videophone or interphone.

There are systems already known, in the audio-visual field, where one image is inlaid within another; these are called "picture in picture". This technique enables an image coming from one source, for example a first television channel, to be inserted into an image coming from a second source, for example another television channel. This technique, which is implemented at the electronic level, presents a number of drawbacks. On the one hand, it is the whole of the image coming from the first source that is displayed, even if the user is interested in only a part of this image. On the other hand, it is limited to video image sources and is not adapted to the heterogeneous sources of data and media coming from the Internet, which are handled at the software level. Moreover, the number of images that may be inlaid is limited, in general to one, or even, in the video-surveillance field, to a regular matrix of four, or even nine, images. In addition, the inlaid images may not be superposed over each other. The user, therefore, may neither select a part of the image to be inlaid, nor choose the shape and each dimension of the inlaid image.

There is already, in the computer field, the technique of windowing, which consists of opening several windows simultaneously, for example a window displaying a part of a page handled by a word processor, another window displaying a part of a table handled by a spreadsheet system and a third window displaying an Internet navigation page. This technique also presents a number of drawbacks. On the one hand, for the window that is active, all the borders of the window, which come from the processor or navigation software, are displayed. On the other hand, the content of the windows, in particular the content of Internet navigation windows, is not refreshed. In addition, the combination of windows is not memorized and the user must re-create this combination each time he or she starts up his or her computer.

The aim of the present invention is to remedy these drawbacks. It aims, in particular, to reduce the number of screens that a user must simultaneously monitor by bringing together, on the same screen, information coming from different sources. The problem that the present invention solves is therefore a technical and usability problem.

To this end, according to a first aspect, the present invention envisages an audio-visual program editing process, characterized in that it comprises:
in an iterative manner, a step of editing the combined image comprising:
  a step of selecting an image source,
  a step of selecting a part of the selected image and
  a step of selecting a display format for the said selected image part, in a combined image;
after the end of the step of editing the combined image, a step of memorizing each image source, each image part and each display format of the combined image and
a step of displaying the combined image, in the course of which, the display of each image part is automatically refreshed.

It is observed that each image selected may come from a media generated locally from media or heterogeneous data coming from the Internet or from the local environment.

Thanks to these provisions, the display of margins and tool-bars may be eliminated, the user may retrieve the combined image each time he or she wants it and the image parts are automatically updated.

The present invention also permits the unification, in the single screen, of diverse sources with "translation" into a format enabling display and visual standardization.

According to particular features, in the course of the display step, for at least one image part, each refresh that changes the appearance of the said image part is signaled.

Thanks to these provisions, the user's attention is drawn towards the new content of the said image part.

According to particular features, the process as briefly described above comprises a step of selecting a source of sound signals and, in the course of the step of displaying the combined image, the sound signals coming from the said sound signal source are output.

Thanks to these provisions, the user may follow an audio-visual program.

According to particular features, in the course of at least one step of selecting an image source, an electronic address for a page accessible on a computer network is selected.

Thanks to these provisions, the combined image may comprise pages of sites accessible via the Internet.

According to particular features, in the course of at least one step of selecting an image source, a video file is selected.

Thanks to these provisions, the user may watch an audio-visual content, while monitoring information that he or she is interested in, in other image parts.

According to particular features, in the course of at least one step of selecting an image part, at least two opposite corners of a rectangle are selected, with a pointing device.

Thanks to these provisions, the selection of an image part is simple and quick.

According to particular features, in the course of at least one step of selecting an image part, the content of a code describing a page supplied by the image source is analyzed and the image parts adapted to be selected are extracted and the user selects, with a pointing device, a said image part.

Thanks to these provisions, the image part selected is defined by its content independently of its position in a page or the length of the page.

According to particular features, in the course of at least one step of selecting an image part, the said image part is dragged and dropped, with a pointing device.

Thanks to these provisions, the organization of the combined image is simple and quick.

According to particular features, in the course of at least one step of selecting a display format for a selected image part at least two edges of two image parts are automatically juxtaposed.

Thanks to these provisions, parts of the combined image that might be expendable are used for the display of selected image parts.

According to particular features, in the course of the step of displaying the combined image, for at least one of the image parts, the said image part is displayed only if its content has been altered during a pre-defined preceding length of time.

According to a second aspect, the present invention envisages a device for editing audio-visual programs, characterized in that it comprises:

means for editing a combined image, adapted to carry out, in an iterative manner:
- a selection of an image source,
- a selection of a part of the selected image and
- a selection of a display format for the said selected image part, in a combined image;

memorization means adapted to memorize each image source, each image part and each display format of the combined image and means for displaying the combined image adapted to automatically refresh each image part displayed.

Thanks to these provisions, the display of margins and tool-bars may be eliminated, the user may retrieve the combined image each time he or she wants it and the image parts are automatically updated.

According to particular features, the means for refreshing is adapted, for at least one image part, to signal each refresh that changes the appearance of the said image part.

According to particular features, the device as briefly described above comprises means for selecting a source of sound signals and the means for displaying the combined image is adapted to output the sound signals coming from the said sound signal source.

According to particular features, the means for editing the combined image is adapted, for the selection of an image source, to select an electronic address of a page accessible on a computer network.

According to particular features, the means for editing the combined image is adapted, for the selection of an image source, to select a video file.

According to particular features, the means for editing the combined image comprises a pointing device and is adapted, for the selection of an image part, to select, with the said pointing device, at least two opposite corners of a rectangle.

According to particular features, the means for selecting an image part is adapted to analyze the content of a code describing a page supplied by the image source in order to extract image parts adapted to be selected by the user with a pointing device.

According to particular features, the means for editing the combined image comprises a pointing device and is adapted, for the selection of an image part, to select, to drag and to drop the said selected image part, with the said pointing device.

According to particular features, the means for editing the combined image is adapted, for the selection of an image format, to automatically juxtapose at least two sides of two image parts.

The advantages, aims and characteristics of the device that is the object of the second aspect of the present invention being similar to those of the first aspect of the present invention, as briefly described above, they are not repeated here.

Figure 2A:
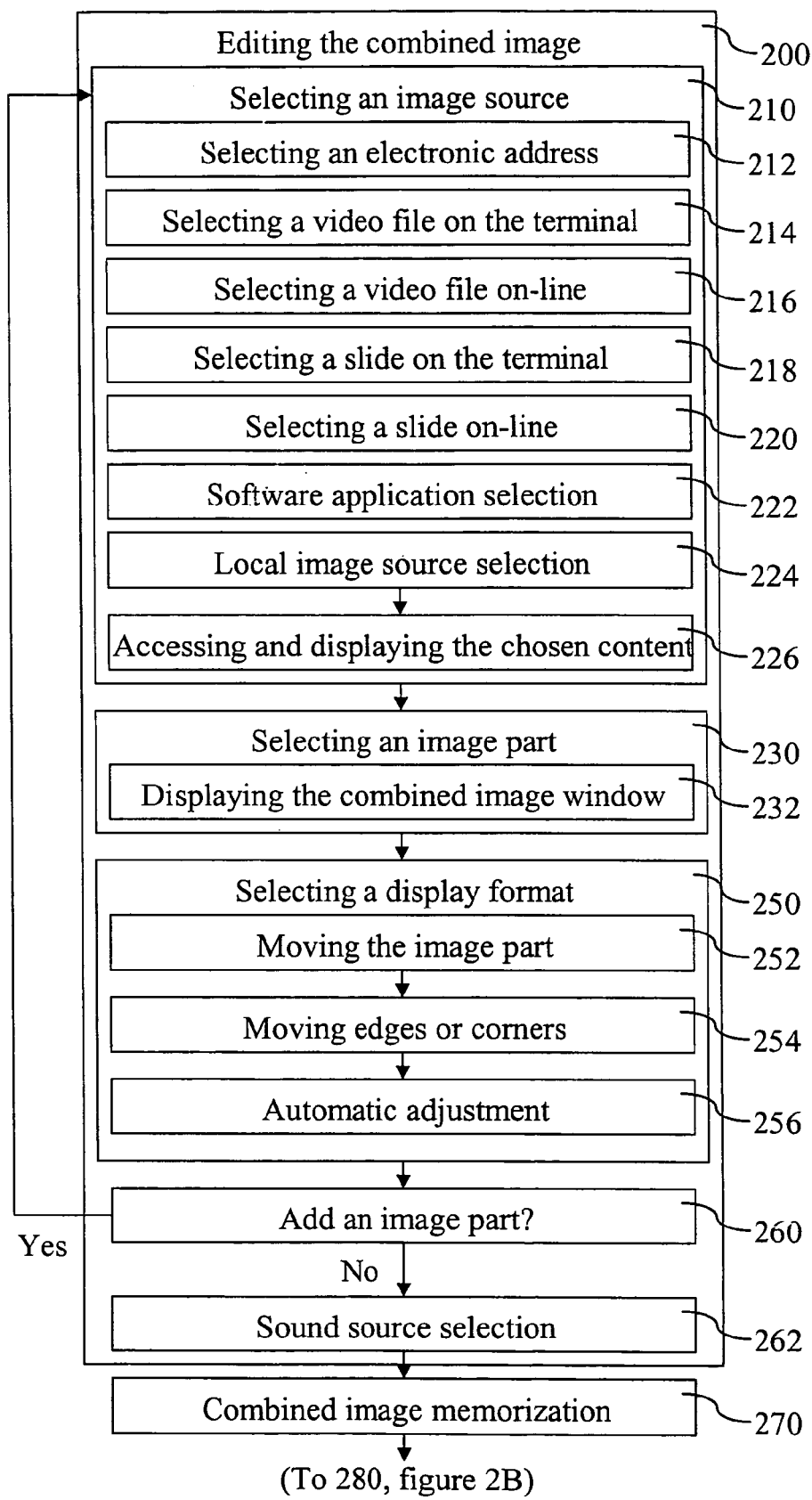
Figure 2B:
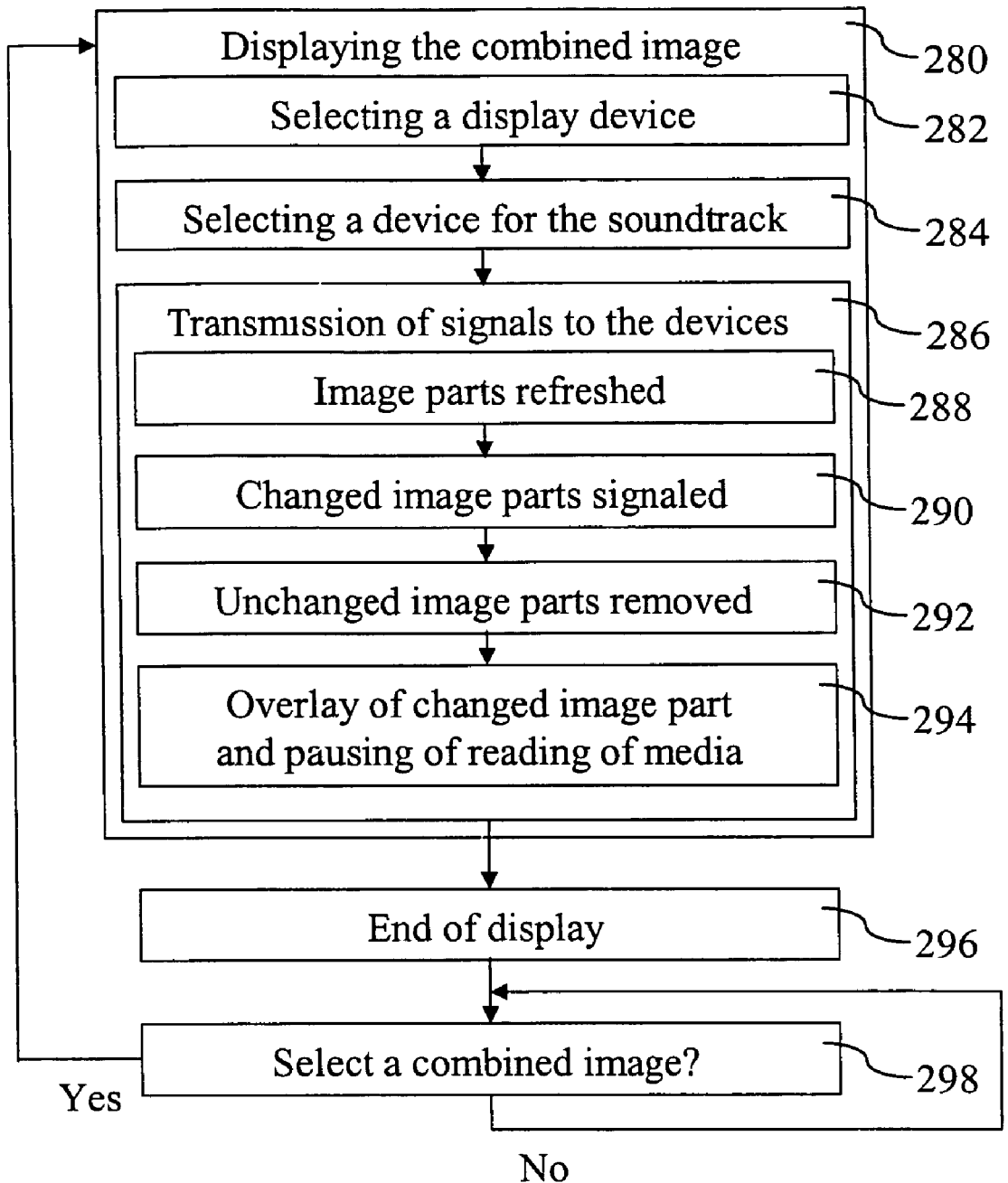
Figure 3:
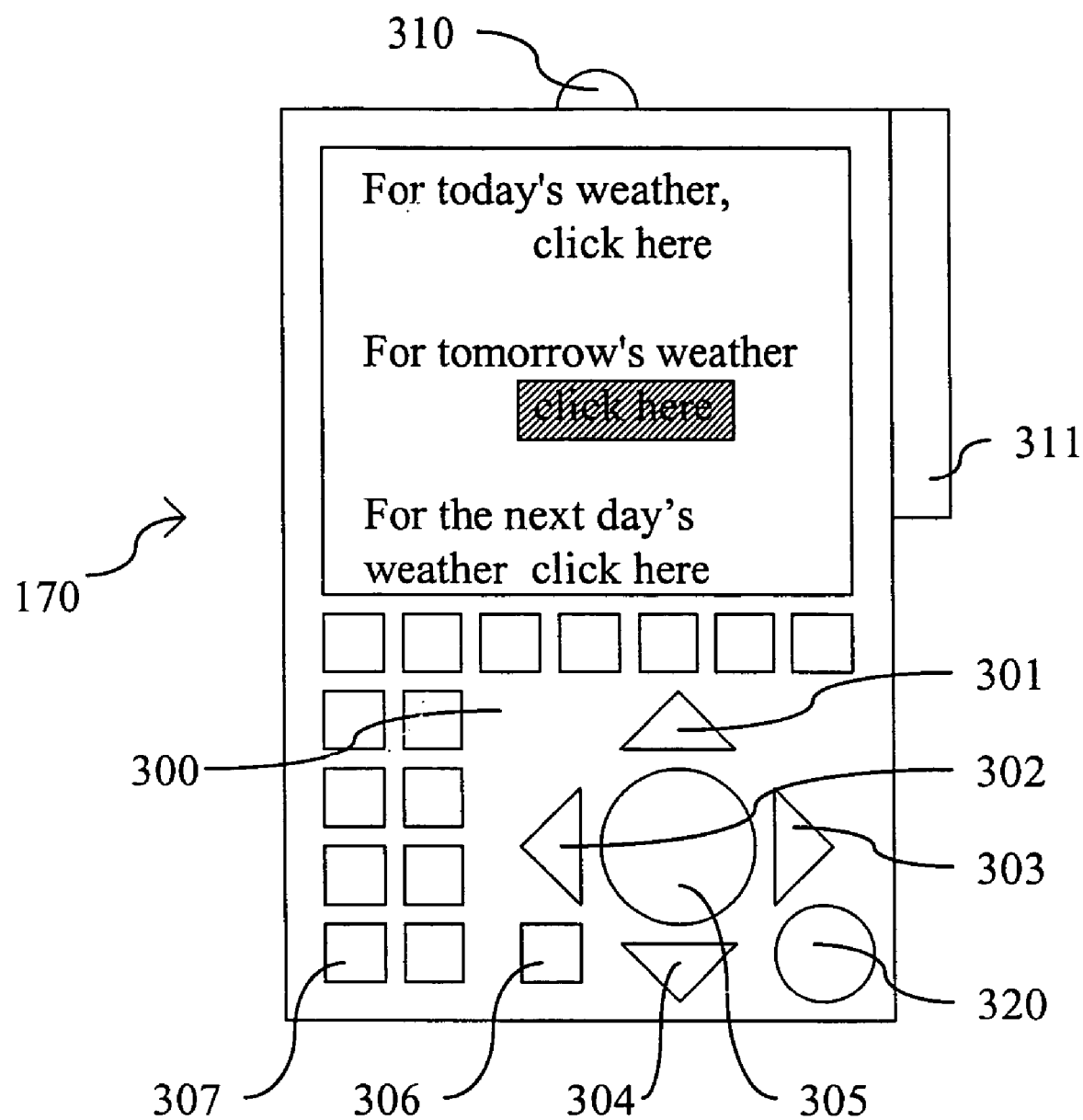

Other advantages, aims and characteristics of the present invention will become apparent from the description that will follow, made, as an example that is in no way limiting, with reference to the accompanying drawings, in which:

FIG. 1 represents, schematically, a particular embodiment of the device for editing images that is the object of the present invention, FIGS. 2A and 2B represent, in the form of a logical diagram, a particular embodiment of the process for editing images that is the object of the present invention and FIG. 3 represents, schematically, a remote control preferentially used in combination with the device illustrated in FIG. 1, during an optional phase of operation of this device.

Though the devices described for accessing a computer network, for example the Internet, are, in the description, described as user terminals, especially of the personal computer type, all types of terminals may be used, for example personal digital assistants (known under the name PDA) and telephones, in particular mobile telephones.

There can be seen, in FIG. 1, a domestic network comprising a user terminal 100, a user terminal 120, a server 125, a television 130, an interphone 140, a surveillance system 145 comprising video surveillance cameras 147, a home automation system 150, a music system 155, a video signal decoder 157 and a film player 160. All these elements are linked to each other by a network 165. Some of these elements are controlled by a remote control 170.

The user terminal 100, of known type, for example in the form of a personal computer (known under the name PC) comprises a central processing unit 102, a non-volatile memory 104, a keyboard 106, a pointing device 108, a display screen 110 and a modem 112. The user terminal 100 is adapted to use an Internet navigation software system and a software system implementing the process that is the object of the present invention.

The non-volatile memory 104 takes, for example, the form of a hard disk. The keyboard 106 is a keyboard with keys or a touch-screen, for example. The pointing device 108 takes, for example, the form of a mouse, a track-ball, a touch-pad or a touch-screen. The modem 112 may be adapted to a switched telephone network, to a broadband network, to a cable network, to a satellite network or to a terrestrial wireless network, for example.

The user terminal 120 is similar to the user terminal 100. The components, sub-systems and software systems of the user terminal 120 are therefore not detailed here.

The interphone 140 is adapted to provide sound and/or image signals of a visitor, in a manner known "per se". The music system 155 is adapted to read musical media and output sound signals.

The film player 160 is of the camcorder, video cassette player or optical disk reader type.

In accordance with the present invention, the user terminal 100 constitutes a device for editing audio-visual programs. The central processing unit 102, in combination with the software system adapted to implement the process that is the object of the present invention, constitutes means for editing the combined image, adapted to perform, in an iterative manner:
- a selection of an image source,
- a selection of a part of the selected image and
- a selection of a display format for the said selected image part, in a combined image.

To this end, the central processing unit 102 uses, for example, a software system implementing the steps described with regard to FIG. 2.

Each selection of each image source is performed by selecting:
- either an electronic address of a page accessible on the computer network, by means of the navigation software,
- or a file of animated images, for example video or animation, on the user terminal or the network,
- or a slide file, on the user terminal or the network,
- or a software application available locally, for example an e-mail editor,
- or a local image source, e.g., the interphone 140, the surveillance system 145 comprising video surveillance cameras 147, the video signal decoder 157 or the film player 160.

Once the image source has been selected, the user selects a part of it with the pointing device 108, for example by selecting a rectangular part of the image according to known techniques, for example by selecting two opposite corners of the rectangle.

Then the user selects, with the pointing device 108, the image part selected previously, activates a window representing the combined image and drops the image part selected in the window representing the combined image.

Then the user moves the selected image part and adjusts the format of the image part by moving its edges or its corners, like in a slide editing or a paint software program. The user may also choose to have the adjustment done automatically, the edges of the newly added image part being thus moved in order to be juxtaposed to the edges of the images parts already incorporated in the combined image.

It is noted that the creation of a combined page is in fact an association of independent software agents, each among them being responsible for displaying the content of an image part in a position that it is given by the application that combines them. The combination software system thus has an (extendable) library of agents and informs them of the arrangement desired.

It is noted that a number of types of software agents may be used:

the first type of agent builds up an image coming from a source virtually, extracts a part of it according to the co-ordinates of points in the image, carries out formatting on the image part and displays it in the part of the combined image intended to receive said image part; the advantage of such an agent is that it is universal, which means that it can work on any type of image whatsoever, coming from sources of video images, for example film and video surveillance images, but its drawback is that for images described by descriptive languages, for example HTML, it does not identify data according to their relevance and it may display an image part that is not pertinent when the length of the page supplied by the image source varies;

the second type of agent works on the page content; as soon as the page is available, it is analyzed in order to extract areas likely to be selected, according to their description in the descriptive code of the page (for example, in HTML code), for example, all the page's graphics, are made selectable; during selection, the user may only select the image parts extracted in this way, by using the mouse; possibly, one or more agents of this type carry out the coding of a new page from parts selected with each agent and the third type of agent works on pages or parts of pages pre-processed by their suppliers—these pages or parts of pages are directly selectable by the users, either by their URL electronic address, or by selection with the mouse.

The last two types of agent make it possible to perform a selection of an image part according to its description or its content or its relevance independent of the way in which it may be displayed in a given configuration.

After finishing selecting the image part, the user may, at any moment, edit the combined image in order to add, modify or remove image parts or their format; this editing is described in greater detail with regard to FIG. 2.

After or at the end of the editing phase, the central processing unit 102 carries out the memorization, in non-volatile memory 104, of each image source, each image part and each display format of the combined image. This memorization is, for example, carried out automatically, after confirmation by the user, each time the window representing the combined image is closed, if one of the items of data memorized has been modified.

In preferred embodiments, the combined image is displayed in a window that has, in at least one display mode, no margin and no tool bar.

The combined image may be displayed on the display screen 110 of the user terminal 100 or transmitted over the network in a format compatible with each display means chosen to display the combined image.

As long as the combined image is displayed and/or transmitted over the network, the central processing unit 102 automatically carries out an automatic refresh for each image part incorporated within the combined image.

To this end, except for the audio or video files that are read continuously, the central processing unit 102 requires, at regular intervals of time, the transmission, by the corresponding sites, of each page accessible on the network that has a part incorporated within the combined image. The automatic refresh may be the action of a program (for example script) incorporated within the page in question or a refresh command coming from another program external to the page.

It is noted that the user may choose a refresh frequency, or leave a refresh frequency given as default, for example, several times a second for animated or video image sources and several times an hour for the other sources.

For the animated image sources, for example coming from video signals, the central processing unit incorporates, permanently, the image parts selected in the combined image.

According to a variant, or according to an operating mode which the user may choose, the central processing unit 102 is adapted, for at least a portion of the image parts, for example for at least the image parts coming from distant sites, to signal each change of content of said image part, for example by placing, for several seconds, a white frame around the image part whose content has been changed.

According to another variant, or according to an operating mode which the user may choose, the central processing unit 102 is adapted, when the content of an image part has not been changed during a pre-defined period, for example twenty seconds, to remove from the display the image part in question, until its content is changed. At least one of the other image parts then automatically occupies the space left empty by the temporary non-display of the image part in question. For example, one of the image parts is defined, by the user, as having priority for occupying the said space.

Thus, for at least one of the image parts of the combined image, the said image part is displayed only if its content has been altered during a pre-defined preceding length of time.

This automated display, which the user may decide to set in motion, enables the user to concentrate on the active contents, and still be sure of being notified of any modification of data that he or she is interested in.

In a variant, the content that has just changed is displayed on top of the rest of the image.

During editing, the central processing unit 102 is adapted to select at least one source of sound signals, for example a source of video signals, and the central processing unit 102 is adapted to attach the audio signals coming from said source to signals representing the combined image or, when the display is local, to make the user terminal output the said sound signals.

In a variant, when a signal comes from another source defined as having priority, for example an interphone or telephone, the central processing unit replaces the audio signal previously transmitted, by the audio signal having priority. Possibly, the central processing unit causes reading of audio or video files to be paused.

In preferred embodiments, the display and transmission functions of the central processing unit 102 are performed as background tasks, only the edit functions for the combined image being performed as other than background tasks.

FIGS. 2A and 2B show different steps of a particular embodiment of the process that is the object of the present invention, essentially comprising:
- in an iterative manner, a step of editing the combined image 200 (FIG. 2A) comprising:
  - a step of selecting an image source 210,
  - a step of selecting a part of the selected image 230 and
  - a step of selecting a display format for the said selected image part, in a combined image 250;
- after the end of the step of editing the combined image 200, a step of memorization 270 of each image source, each image part and each display format of the combined image and
- a step of displaying the combined image 280, in the course of which, the display of each image part is automatically refreshed.

During a step of selecting an image source 210, one selects:
- either an electronic address of a page accessible on the computer network, by means of the navigation software, step 212,
- or a file of animated images, for example video or animation, on the user terminal, step 214, or the network, step 216,
- or a slide file, on the user terminal, step 218, or on the network, step 220,
- or a software application available locally, for example an e-mail editor, step 222,
- or a local image source, here the interphone 140, the surveillance system 145 comprising video surveillance cameras 147, the video signal decoder 157 or the film player 160, step 224.

After each of these steps, a software application giving access to and displaying the chosen content is started up, according to known techniques, step 226, for example in a special window.

Once an image source has been selected, the user selects a part of it, step 230, with the pointing device 108, for example by selecting a rectangular part of the image, according to known techniques, for example by selecting two opposite corners of the rectangle.

Then the user selects, with the pointing device 108, the image part selected previously, step 232, activates a window representing the combined image, step 234, and drops the image part selected in the window representing the combined image, step 236.

Then, during step 250, the user moves the selected image part, step 252, and adjusts the format of the image part by moving its edges or its corners, step 254, like in a slide editing or a paint software program. The user may also choose to have the adjustment done automatically, the edges of the newly added image part being thus moved in order to be juxtaposed to the edges of the images parts already incorporated in the combined image, step 256.

In a variant (not shown), the user may choose a refresh frequency, or leave a refresh frequency given as default, for example, several times a second for animated or video image sources and several times an hour for the other sources.

Then, during a step 260, the user is asked, for example in a window, if he or she wishes to add an image part to the combined image. If yes, this then returns to step 210. If not, the user is asked to which image parts the broadcast sound should be attached, step 262, and, possibly, the user clicks on each image part with which the associated sound should be broadcast, for example an image part representing a film, the interphone and the sound signals linked to the electronic mail editing software application or the user indicates that he or she does not want any sound broadcast and closes the window.

In a variant, the user may select at least one source of sound signals having priority, for example an interphone or a telephone, so that, when a signal comes from a source having priority, the audio signal previously transmitted is replaced by the audio signal having priority and, possibly, the reading of audio and/or video signals is paused.

The edit phase is then finished.

It is noted that the user may, at any moment, choose to edit the combined image (step not shown), for example by clicking on an icon representing the software application, in a tool bar or in a directory, or by making a menu of the software application appear, for example with the right button of the mouse or with the remote control, and by selecting "edit". This menu may also have "pause/restart", "parameters" and "exit" functions, for example, but these functions are not detailed in the description, being well known to the man skilled in the art.

Each edit phase comprises the steps described above; if a new image part is added, a step of removing an image part, by selecting a part and choosing a delete function, or a step of modifying the display parameters of an image part, as indicated above with reference to the format, or of setting application parameters, for example number of colors displayed, definition, only living content image parts displayed, sound source selection, etc.

After or at the end of the editing phase, the memorization, in non-volatile memory 104, of each image source, each image part and each display format of the combined image is carried out, step 270. The memorization step is, for example, carried out automatically, after confirmation by the user, each time the window representing the combined image is closed, if one of the items of data memorized has been modified.

It is noted that the user may give a name to the combined image; this name is then memorized. This allows several users to each use several combined images, for example at different times of the day.

During the step of displaying the combined image 280 (FIG. 2B), the user chooses at least one display device out of those accessible on the network, for example the television 130, step 282, and, possibly, a device for broadcasting sound waves, out of those accessible on the network, step 284.

Thus, for example, the combined image may be displayed on the display screen 110 of the user terminal 100 and/or transmitted over the network in a format compatible with each display means chosen to display the combined image.

The selection of each display device may be performed by a remote control using the UPnP protocol, for example.

During a step 286, signals representing the combined image are transmitted to the display device and signals representing the sound signals coming from selected sound sources are transmitted to the devices broadcasting sound waves.

In preferred embodiments, the combined image is displayed in a window that has, in at least one display mode, no margin and no tool bar.

During the step 286, each image part displayed is automatically refreshed, step 288. To this end, the transmission, by the corresponding sites, of each page accessible on the network is required at regular intervals of time.

For the animated image sources, for example coming from video signals, the image parts selected are incorporated, permanently, in the combined image.

According to an operating mode which the user may choose, for at least a portion of the image parts, for example for at least the image parts coming from distant sites, each change of content of said image part is signaled, for example by placing, for several seconds, a white frame around the image part whose content has been changed, step 290.

According an operating mode which the user may choose, when the content of an image part has not been changed during a pre-defined period, for example twenty seconds, the image part in question is removed from the display, step 292, until its content has been changed. At least one of the other image parts then automatically occupies the space left empty by the temporary non-display of the image part in question. For example, one of the image parts is defined, by the user, as having priority for occupying the said space. Thus, for at least one of the image parts of the combined image, the said image part is displayed only if its content has been altered during a pre-defined preceding length of time. This automated display, which the user may decide to set in motion, enables the user to concentrate on the active contents, and still be sure of being notified of any modification of data that he or she is interested in.

In a variant, during the step 294, the content that has just changed is displayed on top of the rest of the combined image.

In a variant, during the step 294, the reading of media is paused while a content that has just changed is being displayed.

During a step 296, the user decides to no longer display the combined image, for example by using a remote control or a software menu implementing the process that is the object of the present invention and the process comes to an end.

During a step 298, it is determined whether the user has selected a combined image from among the various combined images for which each image source, each image part and each display format have been memorized in non-volatile memory 104 during one of the steps 270.

If yes, this then returns to step 280. If not, step 298 is repeated.

If, during the step 298, the user selects one of the images incorporated in the combined image, for example selecting with a remote control's movement arrow keys and confirming with the confirmation key, then the display device only displays this selected image on the full screen, the remote control's "return" key making it possible to return to displaying the combined image.

In preferred embodiments, the signal transmission and display functions are performed as background tasks, only the edit functions for the combined image being performed as other than background tasks.

If, with the remote control, the user selects a medium accessible via Internet, the corresponding page is displayed at the said address and the software application automatically finds all the hypertext links available on the page as well as their position in the page (in X and Y coordinate axes).

By using the remote control's keyboard arrows, the user may choose and select a link from the page (see FIG. 3).

Thus, in certain embodiments of the present invention, the user is provided with an embedded Internet navigator for environments that do not have one. Here the definition of a "navigator" used is that of an application making use of the Internet network and presenting data coming from it in a graphical form.

To this end, the device that accesses the Internet, here the terminal 100, carries out the identification of all the links present on the page and arranges them in a list which it keeps. For example, this identification is carried out by standard functions of the operating system or the navigator, which the software calls up. Other techniques may be used, such as analyzing HTML source code in order to detect the tags signaling the existence of links in the page.

Each link is then identified by its physical position in the page displayed and the relationships between the physical positions of the links are mapped with the remote control's arrow keys in a two-dimensional table in which each cell is occupied, at most, by one link.

For example, starting from a first link, the other link which is to the right of the first link at an angle in the range [+45°, −45°] and the closest of the first link is assigned to the right cell of the table, with regard to the cell corresponding to the first link.

Starting from the first link represented in a given cell of this table, when the user presses the right arrow of the remote control's keyboard, it causes the link that is in the cell of the table to the right of the cell assigned to the first link to be highlighted.

The first link highlighted is the first link of the list when the page is first displayed. Thus, links are highlighted starting with the link that is the highest to the left, followed, according to a search algorithm, by the "closest" link according to the navigation key or arrow 301 to 304 pressed.

Once the relevant link is highlighted, the user presses the confirmation key 305 to select the link, just as if he or she had clicked on it with a mouse-type pointing device.

To exit the page, the user presses the return key 306 on his or her remote control 170.

FIG. 3 shows that the remote control 170 comprises a keyboard 300 consisting of arrow keys 301 to 304, a confirmation key 305, a return key 306 and other keys 307, an emitter/receiver of visual signals 310, for example of infra-red signals, and an emitter/receiver of radio signals 320. The remote control 170 is adapted to control all or some of the devices shown in FIG. 1 and, in particular, the television 130 and the signal decoders 157 by means of infra-red signals and the terminal 100, by means of radio signals.

Though the remote control 170 is described here in the form of a standard remote control, it may, in accordance with the present invention, take the form of a personal digital assistant or a hand-held computer (known under the name "pocket PC") or a mobile telephone.

Thus, the remote control 170 communicates both over a radio medium, with the user terminal 100, and over an infra-red medium, with the television 130 or with the signal decoder 157, in a manner known "per se".

By using the present invention, the user may have, on one auxiliary input of his television, for example auxiliary 1, one channel, a film player output 160 and, on one auxiliary input, for example auxiliary 2, access to a list of combined images that he or she has created.

The remote control 170 thus gives access, by simplified ergonomics using the arrow and confirmation keys, to combined images comprising personalized television channels and to content accessible via the links of the image parts of these combined images.

It is noted that the remote control 170 also controls the sound and the pause and restart functions for broadcasting a medium.

In a variant, the remote control comprises means for detecting orientation. For example, this means for detecting orientation comprises at least one gyroscope, the relative movements of the remote control casing with relation to each gyroscope, whose orientation in space is noticeably constant, being measured and taken into account in order to produce means for pointing whose functions are similar to those of a mouse, for example.

If, as shown in FIG. 3, the graphical user interface, or GUI, is located on the remote control, the orientation signals coming from each gyroscope are used by the remote control's circuits in order to move a cursor in this interface. If, in a variant, the graphical user interface is located on a screen external to the remote control, for example a television screen or computer screen, the cursor position signals are transmitted remotely, to the computer system. The remote control also comprises at least one key whose functions are similar to those of a mouse button. It is understood that such a remote control makes it possible to start, stop, and pause reading media and to perform other functions, by means of menus or icons, for example.

It is noted that a thin operating system is sufficient to use the present invention, in particular on devices that are not computers, for example the signal decoder 157.

The invention claimed is:

1. An audio-visual program editing process that comprises:
   in an iterative manner, a step of editing the combined image comprising:
   a step of selecting an image source,
   a step of selecting a part of the selected image and
     a step of selecting a display format for the said selected image part, in a combined image;
   after the end of the step of editing the combined image, a step of memorizing each image source, each image part and each display format of the combined image and
   a step of displaying the combined image, in the course of which, the display of each image part is automatically refreshed.

2. An audio-visual program editing process according to claim 1, wherein, in the course of the display step, for at least one image part, each refresh that changes the appearance of the said image part is signaled.

3. An audio-visual program editing process according claim 1 that comprises a step of selecting a source of sound signals and, in the course of the step of displaying the combined image, the sound signals coming from the said sound signal source are output.

4. An audio-visual program editing process according to claim 1 wherein, in the course of at least one step of selecting an image source, an electronic address for a page accessible on a computer network is selected.

5. An audio-visual program editing process according to claim 1 wherein, in the course of at least one step of selecting an image source, a video file is selected.

6. An audio-visual program editing process according to claim 1 wherein, in the course of at least one step of selecting an image part, at least two opposite corners of a rectangle are selected, with a pointing device.

7. An audio-visual program editing process according to claim 1 wherein, in the course of at least one step of selecting an image part, the content of a code describing a page supplied by the image source is analyzed and the image parts adapted to be selected are extracted and the user selects, with a pointing device, a said image part.

8. An audio-visual program editing process according to claim 1 wherein, in the course of at least one step of selecting an image part, the said image part is dragged and dropped, with a pointing device.

9. An audio-visual program editing process according to claim 1 wherein, in the course of at least one step of selecting a display format for a selected image part at least two edges of two image parts are automatically juxtaposed.

10. An audio-visual program editing process according to claim 1 wherein, in the course of the step of displaying the combined image, for at least one of the image parts, the said image part is displayed only if its content has been altered during a pre-defined preceding length of time.

11. A device for editing audio-visual programs that comprises:
    means for editing a combined image, adapted to carry out, in an iterative manner:
    a selection of an image source,
    a selection of a part of the selected image and
      a selection of a display format for the said selected image part, in a combined image;
    memorization means adapted to memorize each image source, each image part and each display format of the combined image and
    means for displaying the combined image adapted to automatically refresh each image part displayed.

12. A device for editing audio-visual programs according to claim 11 wherein the means for refreshing is adapted, for at least one image part, to signal each refresh that changes the appearance of the said image part.

13. A device for editing audio-visual programs according to claim 11 that comprises means for selecting a source of sound signals and the means for displaying the combined image is adapted to output the sound signals coming from the said sound signal source.

14. A device for editing audio-visual programs according to claim 11 wherein the means for editing the combined image is adapted, for the selection of an image source, to select an electronic address of a page accessible on a computer network.

15. A device for editing audio-visual programs according to claim 11 wherein the means for editing the combined image is adapted, for the selection of an image source, to select a video file.

16. A device for editing audio-visual programs according to claim 11 wherein the means for editing the combined image comprises a pointing device and is adapted, for the selection of an image part, to select, with the said pointing device, at least two opposite corners of a rectangle.

17. A device for editing audio-visual programs according to claim 11 wherein the means for selecting an image part is adapted to analyze the content of a code describing a page supplied by the image source in order to extract image parts adapted to be selected by the user with a pointing device.

18. A device for editing audio-visual programs according to claim 11 wherein the means for editing the combined image comprises a pointing device and is adapted, for the selection of an image part, to select, to drag and to drop the said selected image part, with the said pointing device.

19. A device for editing audio-visual programs according to claim 11 wherein the means for editing the combined image is adapted, for the selection of an image format, to automatically juxtapose at least two sides of two image parts.

20. A device for editing audio-visual programs according to claim 11 wherein the means for displaying the combined image are adapted, for at least one of the image parts, to display the said image part only if its content has been altered during a pre-defined preceding length of time.

* * * * *